United States Patent [19]
Kawachi

[11] Patent Number: 5,435,191
[45] Date of Patent: Jul. 25, 1995

[54] NATURAL FREQUENCY MEASUREMENT APPARATUS AND TENSION MEASUREMENT APPARATUS USING THE SAME

[75] Inventor: Kiyoshi Kawachi, Tokyo, Japan

[73] Assignee: Kawach Kenkyusho Co., Ltd., Japan

[21] Appl. No.: 150,019

[22] PCT Filed: Apr. 7, 1993

[86] PCT No.: PCT/JP93/00447
§ 371 Date: Nov. 15, 1993
§ 102(e) Date: Nov. 15, 1993

[87] PCT Pub. No.: WO93/20415
PCT Pub. Date: Oct. 14, 1993

[30] Foreign Application Priority Data

Apr. 7, 1992 [JP] Japan .................................. 4-113953
Aug. 13, 1992 [JP] Japan .................................. 4-237663
Jan. 6, 1993 [JP] Japan .................................. 5-015857

[51] Int. Cl.6 ............................................. G01L 1/00
[52] U.S. Cl. .................................. 73/862.41; 73/862.59
[58] Field of Search ............... 73/862.41, DIG. 1, 599, 73/602, 862.59

[56] References Cited

U.S. PATENT DOCUMENTS

| | | | |
|---|---|---|---|
| 4,565,099 | 1/1986 | Arnold | 73/862.41 |
| 4,692,615 | 9/1987 | Mensah et al. | 73/862.41 |
| 4,928,538 | 5/1990 | Burdess et al. | 73/862.41 |
| 5,251,491 | 10/1993 | Nakaoka et al. | 73/862.41 |

Primary Examiner—Richard E. Chilcot, Jr.
Assistant Examiner—R. L. Biegel
Attorney, Agent, or Firm—Westman, Champlin & Kelly

[57] ABSTRACT

The vibration of a belt or the like detected by a microphone is shaped into rectangular waveforms. The period of each cycle of waveform is held by a latch (8) and sequentially stored in a period memory (12). In a cycle comparison unit (14), waveforms in an expected allowable range of variations are extracted by comparison with the fiducial period. The series of the extracted waveforms are stored in a memory (16). A selection unit (18) selects a representative value from the series of extracted waveforms. A frequency calculating unit (19) calculates the frequency in accordance with the representative value. A tension calculating unit (20) assigns the calculated frequency (characteristic frequency) to a given formula to work out the tension of the belt or the like. It may be possible to calculate the frequency directly from the latched period and then execute the processes to follow.

24 Claims, 7 Drawing Sheets

FIG. 6

| DATA NO. | FREQ. (Hz) | DATA NO. | FREQ. (Hz) | DATA NO. | FREQ. (Hz) |
|---|---|---|---|---|---|
| 1 | 12.19 | 23 | 156.10 | 45 | 166.33 |
| 2 | 12.19 | 24 | 230.52 | 46 | 249.13 |
| 3 | 450.45 | 25 | 177.43 | 47 | 249.13 |
| 4 | 255.75 | 26 | 177.18 | 48 | 130.55 |
| 5 | 255.75 | 27 | 172.24 | 49 | 289.35 |
| 6 | 548.85 | 28 | 156.99 | 50 | 88.17 |
| 7 | 518.67 | 29 | 179.53 | 51 | 87.43 |
| 8 | 775.19 | 30 | 167.90 | 52 | 87.43 |
| 9 | 181.95 | 31 | 198.10 | 53 | 86.31 |
| 10 | 179.08 | 32 | 198.10 | 54 | 89.43 |
| 11 | 387.60 | 33 | 166.22 | 55 | 88.25 |
| 12 | 340.14 | 34 | 197.08 | 56 | 88.25 |
| 13 | 195.69 | 35 | 170.88 | 57 | 91.21 |
| 14 | 510.73 | 36 | 202.68 | 58 | 91.21 |
| 15 | 225.63 | 37 | 177.18 | 59 | 91.68 |
| 16 | 225.63 | 38 | 177.62 | 60 | 93.23 |
| 17 | 225.73 | 39 | 177.24 | 61 | 93.23 |
| 18 | 146.67 | 40 | 177.24 | 62 | 89.99 |
| 19 | 530.79 | 41 | 173.79 | 63 | 89.32 |
| 20 | 530.79 | 42 | 173.79 | 64 | 86.75 |
| 21 | 362.06 | 43 | 178.25 | 65 | 83.98 |
| 22 | 156.10 | 44 | 181.42 | 66 | 17.89 |

FIG. 8

| TOLERANCE RATIO / GROUP NO. | ±5% SUCCESSION TIMES | ±5% FREQ. (Hz) | ±10% SUCCESSION TIMES | ±10% FREQ. (Hz) | ±20% SUCCESSION TIMES | ±20% FREQ. (Hz) | ±30% SUCCESSION TIMES | ±30% FREQ. (Hz) | ±40% SUCCESSION TIMES | ±40% FREQ. (Hz) | ±50% SUCCESSION TIMES | ±50% FREQ. (Hz) |
|---|---|---|---|---|---|---|---|---|---|---|---|---|
| 1 | 1 | 12.19 | 1 | 12.19 | 1 | 12.19 | 1 | 12.19 | 1 | 12.19 | 1 | 12.19 |
| 2 | 1 | 255.75 | 1 | 255.75 | 1 | 255.75 | 1 | 255.75 | 1 | 255.75 | 2 | 255.75 |
| 3 | 1 | 179.08 | 1 | 518.67 | 1 | 518.67 | 1 | 518.67 | 1 | 518.67 | 2 | 646.93 |
| 4 | 2 | 225.68 | 1 | 179.08 | 1 | 179.08 | 1 | 179.08 | 1 | 179.08 | 1 | 179.08 |
| 5 | 1 | 530.79 | 2 | 225.68 | 2 | 340.14 | 2 | 340.14 | 3 | 340.14 | 2 | 267.92 |
| 6 | 1 | 156.10 | 1 | 530.79 | 1 | 225.68 | 1 | 225.68 | 2 | 199.35 | 3 | 199.35 |
| 7 | 2 | 174.71 | 3 | 156.10 | 1 | 530.79 | 1 | 530.79 | 1 | 446.42 | 2 | 446.42 |
| 8 | 1 | 198.10 | 1 | 168.80 | 1 | 156.10 | 1 | 156.10 | 21 | 156.10 | 26 | 183.18 |
| 9 | 7 | 177.05 | 8 | 167.90 | 20 | 178.49 | 21 | 178.44 | 1 | 178.44 | 15 | 89.18 |
| 10 | 1 | 249.13 | 1 | 198.10 | 1 | 249.13 | 1 | 249.13 | 15 | 249.13 | | |
| 11 | 15 | 89.18 | 1 | 175.71 | 15 | 89.18 | 15 | 89.18 | | 89.18 | | |
| 12 | | | 1 | 249.13 | | | | | | | | |
| 13 | | | 15 | 89.18 | | | | | | | | |
| 14 | | | | | | | | | | | | |
| 15 | | | | | | | | | | | | |

NATURAL FREQUENCY MEASUREMENT APPARATUS AND TENSION MEASUREMENT APPARATUS USING THE SAME

TECHNICAL FIELD

This invention relates to a natural frequency measurement apparatus and a tension measurement apparatus using the same. More specifically, the present invention relates to an apparatus for measuring a natural frequency indicative of the state of an object to be measured and also a tension measurement apparatus for calculating the tension of an object to be measured, such as a belt or like, supported between two points based on the measured natural frequency thereof.

BACKGROUND OF THE INVENTION

Belt system has been used widely for transmitting rotational forces and also transporting articles. In such belt system, if a tension of a belt passing round pulleys is not set to a predetermined value, it results in a failure of efficient transmission of torque from one pulley to another or failure of transporting of articles in a stable state. Further, if the belt is not given a tension matched to its own characteristics, its lifetime is shortened to increase the frequency of its replacement.

To solve the above problems, a suitable method of measuring the belt tension is necessary. As a belt tension measurement method, it is known that a natural frequency of a belt passing round pulleys is detected by giving vibrations to the belt and is utilized to calculate the belt tension based on a predetermined formula of calculation. Usually, the natural frequency noted above is measured by surveying a distribution of frequencies by using a displacement measuring apparatus and a frequency analyzer.

However, since the prior art natural frequency measurement apparatus uses a displacement measurement apparatus and a frequency analyzer, the natural frequency measurement apparatus and the tension measurement apparatus for detecting the tension of the object according to the natural frequency thereof are complicated and inevitably large in scale.

An object of the invention is to provide an apparatus for measuring the natural frequency of an object and/or a tension measurement apparatus for detecting the tension of the object such as a belt by utilizing the measured natural frequency, the apparatus having simplified structures.

SUMMARY OF THE INVENTION

The invention has the following features (a) to (d).

(a) A measurement apparatus comprising a microphone for detecting vibrations of an object to be measured (in general, non-contact vibration detection means), period measurement means for measuring the period of a vibration waveform detected by the microphone for each cycle of the waveform, means for detecting a wave group consisting of successive waves, the measured period variation of which are within a predetermined tolerance, and natural vibration data calculation means for calculating either the period or the frequency of a representative waveform in the detected waveform group.

(b) In above mentioned (a), the object to be measured is a body like a belt stretched between two points such as pulleys, and the measurement apparatus further comprises means for calculating the tension of the body according to the period or frequency calculated by the above natural vibration data calculation means and using a predetermined calculation formula.

(c) An apparatus comprising a microphone for detecting vibrations of an object to be measured, means for measuring the frequency of the vibration waveform detected by the microphone for each cycle, means for detecting a waveform group consisting of successive waveforms, the measured frequency variation of which is in a predetermined range, and means for selecting a representative frequency of the waveform group.

(d) In above mentioned (c), the object to be measured is a body like a belt stretched between two pulleys, and the apparatus further comprises means for calculating the tension of the body according to the representative frequency of the waveform group and by using a predetermined calculation formula.

When a belt or like object stretched between two points is given a shock for vibration, it is initially vibrated in an irregular waveform containing various harmonic components and shock components. With the lapse of time, however, it becomes vibrating with a regular waveform natural to it, and a basic waveform at a natural frequency mainly remains.

The present invention is predicated in experimental confirmation of such phenomena, and with the above features (a) to (d) it is possible to detect a regular waveform group having a natural frequency as noted above, i.e., a waveform group consisting of successive waveforms with period variation thereof in a predetermined range. The period of this waveform or the corresponding frequency thereto, i.e., natural frequency of the body under measurement is calculated, and the state such as tension of the object is calculated from the period or natural frequency by using a predetermined calculation formula.

BRIEF DESCRIPTION OF THE DRAWINGS

FIG. 6 is a table showing a numerical example of experimental frequency variation data;

FIG. 8 is a table showing an example of average frequency data for each waveform groups;

DESCRIPTION OF THE PREFERRED EMBODIMENTS

Now, the present invention will be described in detail with reference to the drawings.

Figure 2:
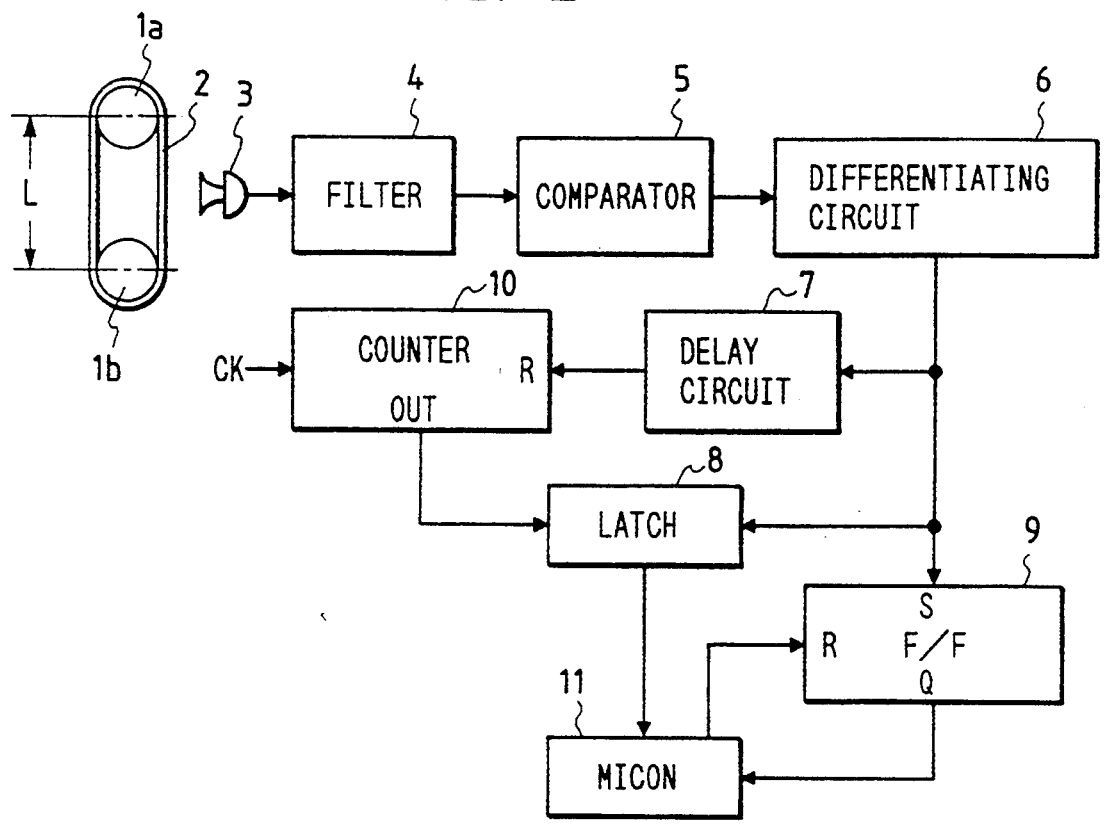
FIG. 2 is a block diagram showing the hardware structure of the measurement apparatus according to the invention.

FIG. 2 is a block diagram showing an embodiment of the natural frequency measurement apparatus according to the present invention, and a hardware structure of tension measurement apparatus using the same. Referring to FIG. 2, round pulleys 1a and 1b disposed at a center-to-center distance L from each other is passed a belt 2, and a microphone 3 (in general, non-contact vibration detector) is disposed such as to face the belt 2. A waveform signal from the microphone 3 is input to a filter 4 for harmonic noise component removal. After the noise removal, the waveform signal is input to a comparator 5 which shapes the input waveform according to a predetermined threshold level and outputs a rectangular or pulse wave signal.

The pulse wave signal is input to a differentiating circuit 6 which detects the rising and falling edges of the input waveform and provides edge detection signals. A rising edge detection signal of the edge detection signals, for instance, is input to a delay circuit 7, a latch 8 and a flip-flop (F/F) 9. A counter 10 counts clock pulses (CK) supplied from a pulse generator (not shown).

The latch 8 latches the count of the counter 10 in response to the edge detection signal noted above. The delay circuit 7 supplies the edge detection signal which has been delayed for a predetermined period of time to the counter 10. The delayed signal is input to a reset terminal R of the counter 10 for resetting the count thereof.

The flip-flop 9 is set by the edge detection signal noted above. The Q-output of the flip-flop 9 is recognized by a microcomputer (MICON) 11 which detects the setting of the flip-flop 9 and thus recognizes that the count of the counter 10 has been held in the latch 8. According to that recognition, the MICON 11 takes in the count held in the latch 8 to store in its memory. After taking in the count from the latch 8, the MICON 11 outputs a clear signal to reset terminal R of the flip-flop 9.

In this way, the period of the rectangular waveform obtained according to the vibration waveform detected by the microphone 3 is stored for each cycle as the count of the counter 10 in the memory in the MICON 11.

In the present embodiment, the counter 10 is cleared whenever the count thereof is latched by the latch 8. Instead of clearing the counter 10 every time, however, it is possible to read successive counts at the edge detection timing as noted above. In the latter case, the period for each cycle can be determined by calculation of the difference of counts in the process in the MICON 11.

With the above structure, by giving the belt with a shock using some batting means (not shown), the vibrations of the belt 2 caused by the shock are detected by the microphone 3, and the vibration period for each cycle is stored in the MICON 11. The waveform of vibrations of the belt 2 is initially irregular as it contains shock and/or harmonic wave components, but it gradually becomes a regular successive wave. This regular waveform is recognized to be of the natural frequency waveform of the belt 2 passed round the pulleys 1a and 1b.

In the present embodiment, the MICON 11 performs a process of detecting the regular waveform on the basis of the taken-in count. Now, a routine for detecting the regular waveform and a routine for detecting the tension in the belt from the detected waveform frequency will be described.

Figure 3:
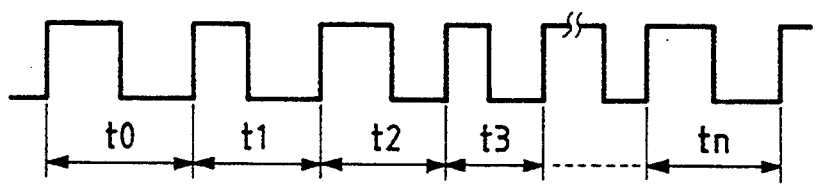
FIG. 3 is a view showing an example of belt vibration waveforms having been shaped to a rectangular waveform.

FIG. 3 shows an example of pulse wave output from the comparator 5. In this embodiment, if a plurality of waveforms with the period thereof within a predetermined tolerance are successive, they are recognized to be regular. First, the difference between a period to and the succeeding period t1 is calculated. If the difference is within the tolerance, the periods t0 and t1 are stored as a first data group in a predetermined memory area. Then, periods t0 and t2 are compared, and if the difference is within the tolerance, the period t2 is stored by adding it to the data group consisting of the periods t0 and t1.

In this way, data, the difference of the period of which with respect to the reference cycle period (here, t0) is within the tolerance, is stored as data in a same group. If the difference of the cycle period compared to the reference period is not in the tolerance, the period which has been recognized to be deviated from the tolerance is used as a new reference period for comparison with the period of the subsequent data from the succeeding process cycle. The data of the waveforms with the periods thereof within the tolerance with respect to the new reference period is stored in a separate group from the previous group.

Of the stable period waveform data which are accumulated in the way mentioned above, the data of the group consisting of the greatest number of stored data is recognized to be pertaining to the natural vibration of the belt. The vibration frequency is calculated from a representative period of the group, e.g., the average period of the data in the group. Finally, the belt tension is calculated by substituting the calculated frequency into the predetermined calculation formula.

The formula for calculating the belt tension T is $$T = (4 \times L^2 \times A \times f^2)/9.8 \tag{1}$$

where f is the natural frequency (Hz) of the belt to be measured, A is the linear density of the belt (kg/m), and L is the center-to-center distance between pulleys (m).

The operation of the present embodiment will now be described with reference to the flow chart of FIG. 4. In step S1, "0" is set as each parameters "a" and "b" used for comparison of the count values. In step S2, "0" is set as a parameter M for discriminating each groups consisting of plural periods of waveform recognized to be regular. In step S3, "0" is set as a flag F used for judgment as to whether or not the first store data in each groups. In step S4, the address count "n" for reading out the count value of the counter 10 is cleared. In step S5, the address count "n" is incremented.

In step S6, the count Cn stored in the address defined by the address count "n", i.e., the count representing the waveform periods, is read out to a work area. In step S7, the read-out count Cn is set as the parameter "b". In step S8, a check is done as to whether the difference between the parameters "a" and "b" is less than a tolerance or a reference value s. If this check yields "YES", the waveform period variation is less enough, and it is determined that the object to be measured is probably undergoing the natural vibration thereof. In this case, the routine thus goes to step S11.

In the first routine cycle, however, since "0" is set as the reference value or parameter "a" in the step S1, the difference between the parameters "a" and "b" is usually greater than the tolerance "s". Thus, the check in the step S8 yields "NO", and the routine goes to step S9. In the step S9, "0" is set as the flag F. Since the flag has been set to "0" in the step S3, in the step S9 in the first routine cycle the state of the flag F is not changed.

In subsequent step S10 the value of the parameter "a" is updated to the value of the parameter "b" to renew the reference period to the latest read-out count data. After the step S10 the routine goes back to the step S5 of incrementing the address count n, and in the subsequent step S6 the count stored in the next address is read out.

If the check in the step S8 yields "YES", the routine goes to the step S11 of checking whether the flag F is "0". If the flag is "0", the routine goes to step S12 to set a new group and store data therein. Specifically, in the step S12, the parameter M is incremented for newly setting the data storage group. In subsequent step S13, the parameters "a" and "b" i.e., two count values indicative of the periods, are stored in the new group designated by the parameter M.

The flag F becomes "1" when it is switched in step S16 to be described later. In this case, a second or following data storage process with respect to the same data storage group is executed. If the flag F is "1", the check in the step S11 yields "NO", and the routine goes to step S14, in which the value of the sole parameter "b" is stored, that is, the reference period for comparison is not changed.

In subsequent step S15, a check is done as to whether all the checks in respect to the count values of the counter 10 being taken out from the latch 8 have been finished. If there are some count values remaining without being processed, the routine goes to the step S16, in which "1" is set as the flag F, and then the routine goes back to the step S5.

In the above mentioned routine, a plurality of periods of successive waveforms with less period variations than predetermined tolerance "s" are stored in a same and single group. When a plurality of groups are produced, the waveform group with the greatest number of data members is determined to correspond to the natural vibration of the object to be measured, because vibration with the period thereof stable for longer time may be considered to be the natural vibration.

Logically, the natural frequency of an object supported at two pints is constant and not changed. In the actual measurement, however, a shock applied to the belt 2 may happen to cause a slight rotation of the pulleys la and 1b, and possibly cause a change in the belt tension. A low frequency noise can also have effect upon the vibration of the belt, too. They may result in creeping changes in the detected period in the increasing or decreasing direction. In such a case, even if the belt vibrates at the natural frequency, the measured period may get out of the tolerance with respect to the reference period. If the period of the waveform compared gets out of the tolerance with respect to the reference period, the number of groups is increased since the reference period is updated progressively. Therefore, not only the process is complicated, but the accuracy of measurement is liable to be lowered.

To avoid the increase of the number of groups and complication of the subsequent process, the period comparison can be done between a pair of successive waveforms. To this end, a step of updating the parameter "a" to "b" (step S17) may be provided after the step S16 in the flow chart as shown by dotted line in FIG. 4. By so doing, the reference period is updated for every process cycle for period comparison between two successive waveforms. In this case, the reference value "s" for the judgment as to whether each period difference is within the tolerance is desirably set to be less than the tolerance in the abovementioned embodiment, in which the reference period is not updated for every process cycle.

Figure 5:
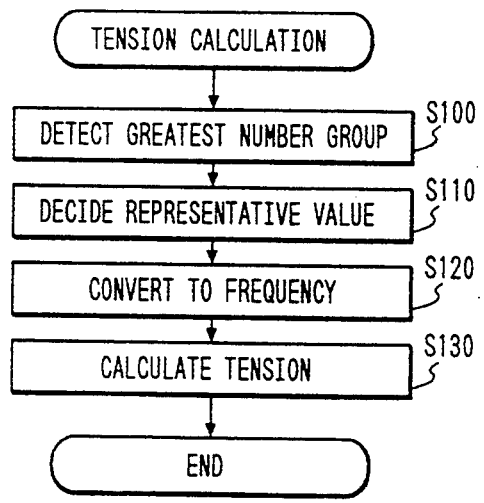
FIG. 5 is a flow chart of tension calculation routine in the operation of the embodiment.

Now, the operation of calculating the tension from data stored for each group will be described. Referring to FIG. 5, in step S100 the greatest number group comprising the greatest number of stored data is selected out of the plurality of groups noted above. That is, a waveform group having the longest duration of successive waveforms with less frequency variation, is selected.

In subsequent step S110, a representative value (or period) which represents the selected greatest number group is decided on the basis of a predetermined algorism. For example, the representative value may be the average or median value of data stored in the greatest group, or a value suitably selected from the data.

In subsequent step S120, the representative period value is converted to a corresponding frequency. In subsequent step S130, the frequency thus calculated is substituted into the natural frequency "f" in the calculation formula (1), and the tension T is calculated by using the preliminarily given linear density A and center-to-center distance L. The calculated tension can be provided as visible output by suitable display such as a liquid crystal panel or a CRT, or printing means.

Now, essential functions of the MICON section 11 in the present embodiment will be described with reference to the block diagram of FIG. 1. The period data, i.e., the count taken out from the latch 8 is stored in a period memory 12. In a reference period setting unit 13, the first count stored in the period memory 12 is set as reference period "a". A period comparator 14 progressively reads out the count "b" from the period memory 12 and detects the difference of the count "b" from the reference period "a" stored in the reference period setting unit 13. If the difference is within the range of the tolerance "s" which is set in advance in a tolerance setting unit 15, the reference period data "a" and the count "b" read out from the period memory 12 are stored in a stable waveform period memory 16.

If it is found as a result of the comparison in the period comparator 14 that the difference is greater than the tolerance "s", the reference period in the reference period setting unit 13 is updated to the newest count "b" which is read latest into the frequency comparator 14. The data taken into the period comparator 14 before the reference period is updated are stored in the stable waveform period memory 16 in the form of single data group. After the updating of the reference period, data are stored in a separate new data group.

Figure 4:
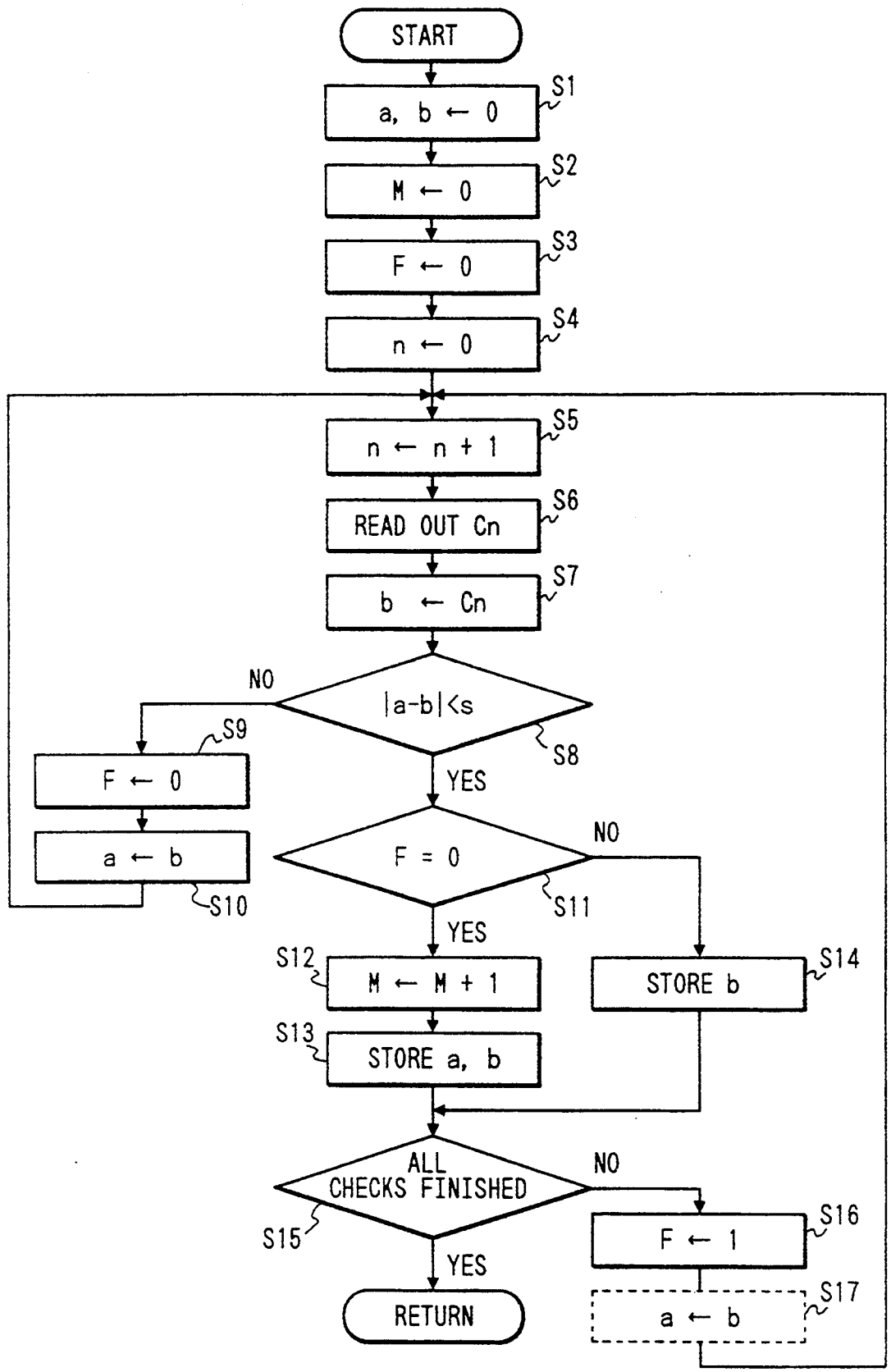
FIG. 4 is a flow chart of waveform data grouping in the operation of the embodiment.

In other case where two successive waveforms are compared as described before in connection with the step S17 in the flow chart of FIG. 4, the period of one-cycle-preceding waveform is always the reference period, and the data in the reference period setting unit 13 is updated with every count value "b" which is newly read into the frequency comparator 14.

A greatest group detector 17 detects a data group comprising of the greatest number of data as a greatest number group out of the data groups stored in the stable period memory 16, the data of the greatest number group being input to a representative value selector 18. If a train of stable waveforms, i.e., a successive waveform group with the period variation thereof in the tolerance, occurs only once, the greatest number group detector 17 fulfills only a function of forwarding data from the stable period memory 16 to the representative value selector 18.

The representative value selector 18 decides a typifying or representative value on the basis of data, i.e., count values in the data group selected by the greatest number group detector 17, for instance by averaging the data or extracting the first, middle or last data in a predetermined procedure.

The selected representative value or period data is input to a frequency calculator 19 for calculation of the frequency (Hz) corresponding to the representative value. The calculated frequency is supplied to a tension calculator 20 for calculation of the belt tension using the formula (1). As is well known, the frequency and period are in the inverse relation to each other, and therefore it is possible to use the period to calculate the tension. The calculated tension data is input to a display unit 21 and/or a printing unit 22 for display and/or printing.

As shown above, according to the invention, a group of successive vibration waveforms with substantially constant periods is selected from vibrations of belt stretched between pulleys, and the tension of the belt is calculated based on the data of this successive vibration waveform group.

In the present embodiment the check as to whether the period is substantially constant is done by checking whether the period variation value is in a predetermined tolerance. However, the check may be done by checking whether the period variation percentage is in a tolerance, too. Further, while in the present embodiment the frequency calculation is made based on the period data, i.e., the count data, after selection of the representative value as mentioned above in connection with FIG. 5, the same results may be obtained by first taking out the count data of the latch 8 into the MICON 11 and then making the frequency calculation according to the taken-in count data, the subsequent processing being executed with respect to the frequency obtained by the calculation.

Figure 1:
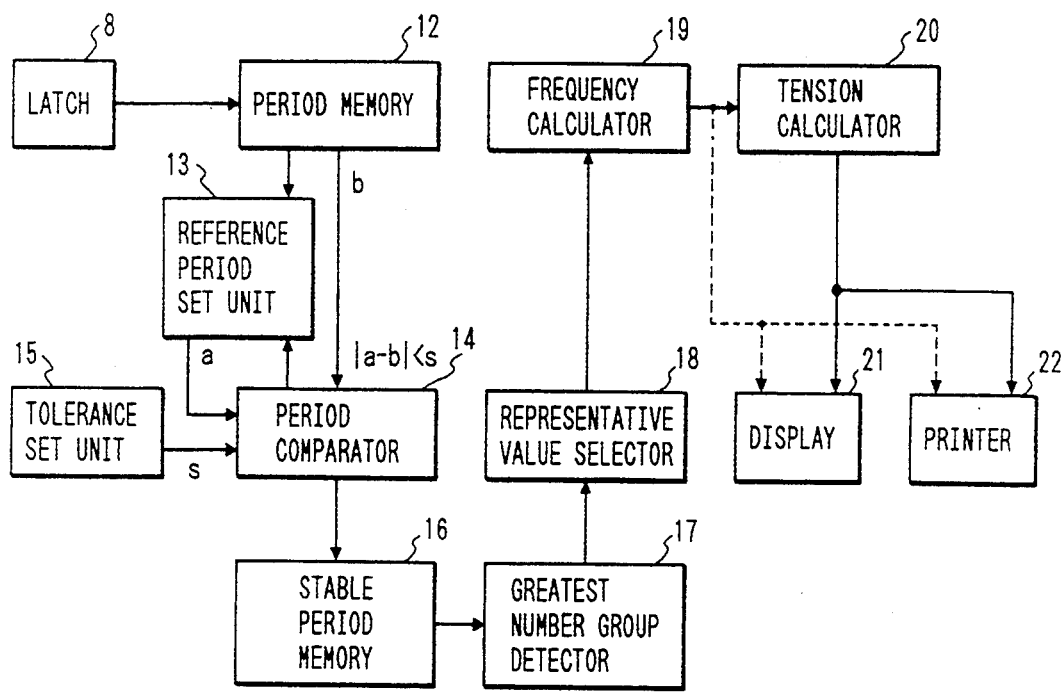
FIG. 1 is a block diagram showing essential functions of an embodiment of the measurement apparatus according to the invention.

Further, while in the structure shown in FIG. 1 the frequency calculated in the frequency calculator 19 is input to the tension calculator 20 for calculation of the tension which is output as visible information by the display and/or printing unit, this is by no means limitative, for example, it is possible to supply the calculated frequency or the period used for the frequency calculation directly to the display unit 21 and/or printing unit 22. In this case, the tension can be recognized by manual Judgment of the result output from the display or printing unit 21 or 22 with reference to a separately prepared frequency (or period) versus tension table. Of course, it is possible to use the displayed or printed frequency or period directly for the judgment of the belt tension without conversion to other characteristic values.

Now, actual changes in the frequency calculated according to the count taken into the MICON 11 will be described by using data obtained in experiments conducted by the inventor.

Figure 7:
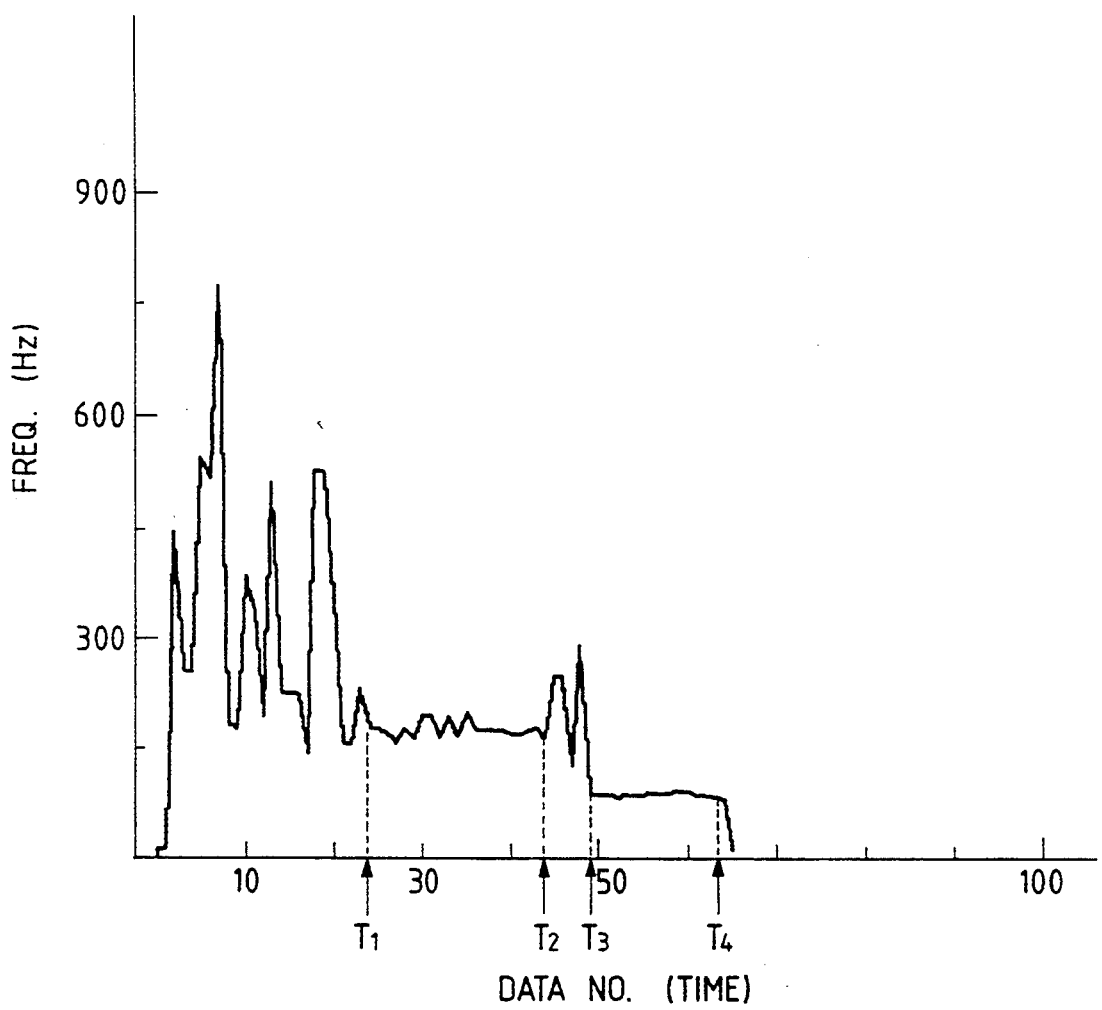
FIG. 7 is a graph showing the experimental frequency variation data example.

FIG. 6 is a table showing belt vibration frequency changes for every cycle with the lapse of time after application of a shock to the belt 2 shown in FIG. 2, and FIG. 7 is s graph drawn by using the data shown in FIG. 6. In FIG. 6, data with smaller data Nos. are in the initial stage of vibration, and those with larger data Nos. are in the final stage of vibration.

As shown in FIG. 7, up to instant T1 after the shock application, the frequency changes greatly irregularly because it contains harmonic and shock components. Subsequently, in time periods between instants T1 and T2 and between instants T3 and T4, there appear waveform parts with comparatively less frequency changes, i.e., comparatively regular successive vibrations. FIG. 8 shows an example of rearranged data for clarifying the numbers of appearance of regular vibrations with less frequency changes.

In the table shown in FIG. 8, the numbered data in the table of FIG. 6 are rearranged in groups each consisting of data members, the variation ratio of which with respect to the first data member in the sequence of data in the table of FIG. 6 is in a predetermined tolerance. The representative values (i.e., the average values in this example) of the individual groups are shown for different predetermined variation ratios. For example, in FIG. 8 numeral figure "2" in the column of the succession times means that there are three (2+1) successive data members within the predetermined tolerance ratio. The pertinent frequency figure in the column of the frequency (Hz) is the average of the three data members. What corresponds to the succession times of 15 in the tolerance ratio column of 10% is a group consisting of 16 data members with data Nos. of 50 to 65 in FIG. 6. The average frequency of these data members is 89.18 Hz.

In the above embodiment, one or more groups consisting of successive waveforms with the period variation ratio thereof within a predetermined range are detected, and if there are a plurality of such groups, a group with the greatest number of succession times is selected for belt tension calculation on the basis of the representative period of the selected group.

The appropriateness of the criterion for group selection in the above embodiment can be confirmed with reference to the rearranged frequency data as shown in FIG. 8. In the above embodiment, a particular group is selected on the basis of the number of successive waveforms with periods within the tolerance. However, as is well known, the "frequency" can be directly substituted for the "period", and they are thus equivalent. This will be verified with reference to FIG. 8 showing frequency data. As seen from FIG. 8, the greatest succession time number group with the tolerance ratio of 5% is the group No. 11 with the number of succession times of 15. Likewise, the greatest succession time number group with the tolerance ratio of 10% is the group No. 13 with succession times of 15. Using the frequency of 89.18 Hz corresponding to the group No. 11 or 13 for the belt tension calculation, the result has been confirmed to be identical with measurement data obtained by a different measurement method usually adopted in the prior art.

However, as seen from FIG. 8, as for the data with the tolerance ratios greater than the range of 5 to 10%, the frequency corresponding to the greatest succession time number group is not always the afore-mentioned frequency of 89.18 Hz. When a greatest succession time number group is determined on the basis of a tolerance ratio of no less than 20%, a waveform group with a frequency of about 178 Hz is selected on the basis of the above selection criterion that "a greatest succession time number group among a plurality of groups is selected", and a true natural frequency can not be obtained. In order to obtain a true natural frequency on the selection criterion in the above embodiment, therefore, it is necessary to set the tolerance ratio to be no greater than 10% for the group selection.

Additionally, other selection criteria have been studied on the basis of the data shown in FIG. 8 to find that the group with the average frequency of 89.18 Hz is detected latest among the detected groups, that is, it is closest to the termination of the vibration of the belt. It is further found that except the groups with no greater than a few succession times within a predetermined tolerance ratio range, i.e., in a different viewpoint, except data which are not recognized to be continuous, the average frequency of 89.18 Hz is the lowest among the average frequencies representative of the groups. These facts well correspond to the phenomena that the natural vibration of the belt appears comparatively stably in the final stage of the vibration period, while in the initial stage of vibration the frequency is instable.

From the above considerations, the above embodiment may be modified as follows to attain the object of the invention. Modifications of the above embodiment of the invention will now be described with reference to the block diagrams of FIGS. 9 and 10 in which reference numerals like those in FIG. 1 designate same or equivalent parts.

Figure 9:
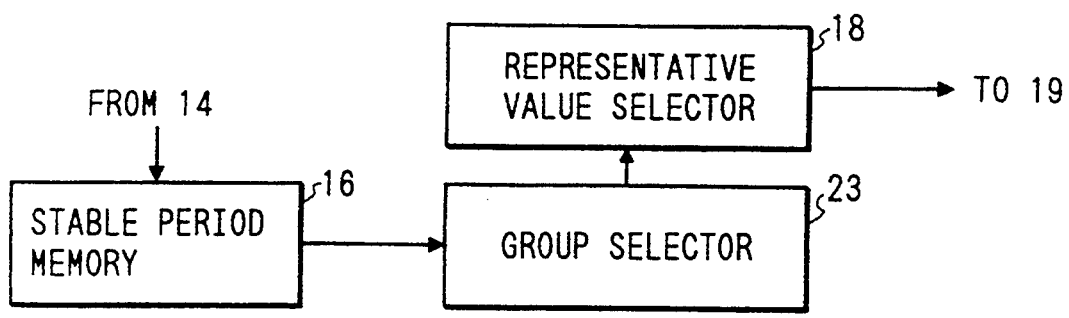
FIG. 9 is a block diagram showing essential functions of a first modification of the embodiment of the measuring apparatus according to the present invention.

FIG. 9 shows a modification of the aforementioned embodiment, in which the latest detected group among a plurality of detected groups is selected for calculation of the natural frequency. In FIG. 9, a group selector 23 extracts the latest detected group out of the groups stored in stable waveform period memory 16 and delivers the extracted group data to the representative value selector 18.

Figure 10:
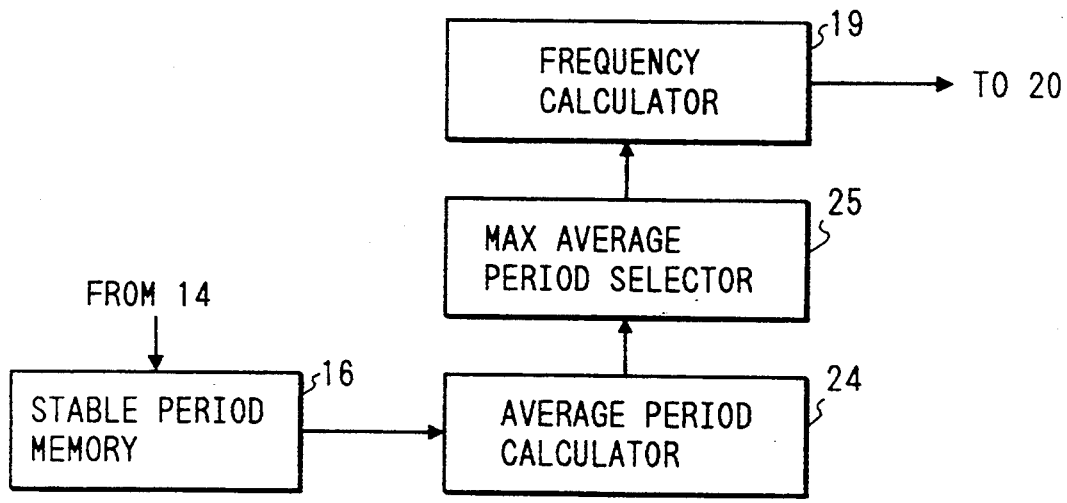
FIG. 10 is a block diagram showing a second modification of the embodiment of the measuring apparatus according to the present invention.

FIGS. 10 shows another modification of the present invention, in which the longest average period group, i.e., the lowest average frequency group, is selected except the groups with no greater than a few data succession times, i.e., non-continuous data groups. In FIG. 10, period data of continuous data groups with the tolerance ratios no greater than a predetermined range (for instance 10%) are selected out of the period data of groups stored in stable waveform period memory 16, and supplied to an average period calculator 24. The average period calculator 24 calculates the average period of each group. The calculated average period data are input to a maximum average period selector 25 for selection of the maximum average period group. The average period data of the selected group is input to the frequency calculator 19 for conversion to the frequency.

In the above modifications of FIGS. 9 and 10, the process and calculation are based on the periods of waveforms stored in the MICON 11. However, like the above mentioned embodiment, it is possible to calculate frequency from each period data taken into the MICON 11, then select regular waveform groups, i.e., the data groups, on a basis of the frequency thus calculated and extract a particular representative group among the data groups. Further, the calculation of average value as a representative value of the particular data group is by no means limitative, and it is possible to make the center value of data or an arbitrarily data value selected out of data group the representative value of that data group.

As will be readily understood from the above description, a period of each waveform in a group according to the present invention may be in a predetermined tolerance with respect to a reference value which is one of a plurality of waveforms belonging to the group. Therefore, the references of Judgment for the waveform group formation as described above are not absolute ones. For example, using the measurement data as shown in FIG. 6 (stored in the MICON 11), waveform group formation may be performed on the following judgment bases.

(1) An arbitrary one of measurement data is selected as a reference value, and a waveform group is formed by taking therein preceding and succeeding data falling within the tolerance with respect to the reference value.

(2) An arbitrary one of measurement data is selected as a reference value, and a waveform group is formed by successively taking therein preceding data falling within the tolerance with respect to the reference value.

(3) two adjacent pieces of data with the difference therebetween within a predetermined tolerance are selected as a primitive waveform group. Then, a provisional waveform group is formed by adding at least one of the opposite side data adjacent to the primitive waveform group, and a check is made as to whether the difference between the maximum and minimum data in the provisional waveform group is within the predetermined tolerance. If the check yields "YES", the provisional waveform group is certified as a new waveform group. This sequence of operations is repeated until there is no more data to be taken in afresh.

Further, while the above embodiment is contemplated for detecting the natural frequency of a belt stretched between pulleys and calculating the tension in the belt from the detected natural frequency thereof, the object under measurement according to the invention is not limited to the belt.

For example, a magnetic tape for electric signal as video and audio signal or an ink ribbon for a thermal printer is manufactured by coating magnetic powder or ink on a film-like base tautly stretched between predetermined support means. The quality of the magnetic tape or ink ribbon is greatly influenced by the quality of coating of the magnetic powder or ink. This means that it is important to properly manage the stretched state or tension of the base film in the coating step. That is, in the magnetic powder or ink coating step, it is required to detect the stretched state of the base as accurately as possible and control it substantially constant.

The present invention is applicable to such a manufacturing process. That is, by causing vibrations of the film-like base stretched between a pair of support means with suitable batting means, the natural frequency of the base can be measured. The support means may be adjusted such as to obtain a natural frequency corresponding to a predetermined tautness of the base, and thus the stretched state or tension of the base can be adjusted accurately.

Further, the invention is applicable not only to belt-like objects but also to other objects which are string-like, linear, sheet-like, etc. for measuring the natural frequency and judging physical properties or characters of the object itself or fitness of the state of mounting on apparatus according to the measured value.

Industrial Applicability

As has been described in the foregoing, according to the invention it is possible to measure the natural frequency of an object like belt passed round pulleys for determining the state of the object such as the tension of the belt without use of any large scale apparatus such as a displacement measurement apparatus or a frequency analyzer but with a simplified apparatus. Thus, the invention is applicable to belt tension measurement in a research or experiment room for investigating belt apparatus and belt materials, and also permits ready on-site tension measurement in various industries using belt apparatuses. Further, it is possible to obtain ready natural frequency measurement on other objects than belts, such as string-like, linear, sheet-like, etc. objects for ready judgment of the physical properties or characters of the object itself and fitness of the state of mounting of the objects in apparatus.

I claim:

1. A machine for converting a vibration signal corresponding to an object into natural frequency data, the machine comprising:
   vibration detection means for detecting damped vibration of an object to be measured by non-contacting detection and providing the vibration signal indicative of the damped vibration detected;
   period measurement means, coupled to the vibration detection means, for receiving the vibration signal and measuring a period of the vibration detected by said vibration detection means for each cycle;
   waveform group formation means configured for determining a variation in each successive two measured periods of a plurality of waveforms, and for forming at least one waveform group, each waveform group comprising a plurality of successive waveforms wherein the variation of the measured period of each waveform is within a predetermined tolerance in each waveform group; and
   natural vibration data determination means configured for determining natural vibration data indicative of at least one of a period and a corresponding frequency of a waveform which represents each waveform group.

2. An apparatus for converting vibration information to natural frequency data, the apparatus comprising:
   vibration detector detecting damped vibration of an object by non-contacting detection and providing a vibration signal containing vibration information based on the damped vibration detected;
   frequency measurement means, coupled to the vibration detector, for receiving the vibration signal and measuring a frequency of vibration detected by the vibration detector;
   waveform group formation means for forming at least one waveform group, each waveform group including a plurality of successive waveforms based on the measured frequency of vibration, the variation in each successive two measured frequencies of vibration corresponding to each successive two waveforms in a waveform group being within a predetermined tolerance; and
   representing frequency determination means for determining a frequency representing each waveform group and providing frequency data indicative of the frequency.

3. The machine according to claim 1, which further comprises means for selecting a particular waveform group having the greatest number of waveforms from among a plurality of waveform groups which have been formed;
   said natural vibration data determination means determining at least one of a period and a corresponding frequency which represents said particular waveform group.

4. The apparatus according to claim 2, which further comprises means for selecting a particular waveform group having the greatest number of waveforms from among a plurality of waveform groups which have been form;
   said representative frequency determination means determining a frequency which represents said particular waveform group.

5. The machine according to claim 1, which further comprises means for selecting a particular waveform group including waveforms based on vibrations which occurred toward an end of a vibration duration of said object to be measured from among a plurality of waveform groups which have been formed;
   said natural vibration data determination means determining at least one of a period and a corresponding frequency which represents said particular waveform group.

6. The apparatus according to claim 2, which further comprises means for selecting a particular waveform group including waveforms based on vibrations which occurred toward an end of a vibration duration of said object to be measured from among a plurality of waveform groups which have been formed;
   said representative frequency determination means determining a frequency which represents said particular waveform group.

7. The machine according to claim 1, which further comprises means for selecting a particular waveform group including a representative waveform with the longest period among a plurality of waveform groups which have been formed;
   said natural vibration data determination means determining at least one of a period and a corresponding frequency which represents said particular waveform group.

8. The apparatus according to claim 2, which further comprises means for selecting a particular waveform group including a representative waveform with the lowest frequency from among a plurality of waveform groups which have been formed;
   said representative frequency determination means determining the representative frequency of said particular waveform group.

9. The machine according to claim 1 wherein said waveform group includes a plurality of waveforms, and at least one of a difference and a variation ratio of a waveform in said group with respect to a reference period is within a predetermined tolerance, and wherein the reference period is the period of one cycle waveform selected from among vibration waveforms detected by said vibration detection means.

10. The apparatus according to claim 2 wherein said waveform group includes a plurality of waveforms, and at least one of a difference and a variation ratio of a waveform in said group with respect to a reference frequency is within a predetermined tolerance, said reference frequency being the frequency of one cycle waveform selected from among vibration waveforms detected by said vibration detection means.

11. The machine according to claim 9, wherein said reference period is one of the immediately preceding and immediately succeeding one cycle waveforms with respect to a period under consideration.

12. The apparatus according to claim 10, wherein said reference frequency is one of the immediately preceding and immediately succeeding one cycle waveforms with respect to a period under consideration.

13. The machine according to claim 1 wherein said waveform group includes a plurality of waveforms, in which at least one of the difference and ratio between a maximum and a minimum one of the periods of the waveforms is within a predetermined tolerance.

14. The apparatus according to claim 2 wherein said waveform group includes a plurality of waveforms, in which at least one of the difference and ratio between a maximum and a minimum one of the frequencies of the waveforms is within a predetermined tolerance.

15. An apparatus for converting a detected vibration characteristic into tension data, the apparatus comprising:

vibration detection means for detecting, by non-contacting detection, damped vibration of an object to be measured supported at two points and providing a vibration signal indicative of the damped vibration detected;

period measurement means for receiving the vibration signal and measuring the period of vibration detected by said vibration detection means for each cycle, based on the vibration signal;

waveform group formation means configured for determining a variation in each successive two measured periods of a plurality of waveforms, and for forming at least one waveform group comprising a plurality of successive waveforms, the variations of the measured periods of which are within a predetermined tolerance;

natural vibration data determination means for determining at least one of a representative period and a corresponding representative frequency which represents the waveform group; and tension calculation means configured for calculating tension data indicative of the tension in said object to be measured by substituting one of the period and frequency determined by said vibration data determination means into a predetermined calculation formula.

16. The apparatus according to claim 15, which further comprises means for selecting a particular waveform group having the greatest number of waveforms from among a plurality of waveform groups which have been formed;

said natural vibration data determination means determining at least one of a period and a corresponding frequency which represents said particular waveform group.

17. The apparatus according to claim 15, which further comprises means for selecting a particular waveform group including vibrations which occurred toward the end of the vibration duration of said object to be measured from among a plurality of waveform groups which have been formed;

said vibration data determination means determining at least one of the period and a corresponding frequency of the waveform representative of said particular waveform group.

18. The apparatus according to claim 15, which further comprises means for selecting a particular waveform group including a representative waveform with the longest period among a plurality of waveform groups which have been formed;

said vibration data determination means determining at least one of a period and a corresponding frequency which represent said particular waveform group.

19. The apparatus according to claim 15, wherein said waveform group includes a plurality of waveforms, and at least one of the difference and the variation ratio of a waveform in said group with respect to a reference period is within a predetermined tolerance, said reference period being a period of one cycle waveform selected from among vibration waveforms detected by said vibration detection means.

20. An apparatus for converting vibration data indicative of detected vibration of an object into tension data indicative of tension of the object, the apparatus comprising:

vibration detection means for detecting damped vibration of an object to be measured supported at two points, by non-contacting detection, and for providing a vibration signal indicative of vibration data which represents the damped vibration detected;

frequency measurement means for receiving the vibration signal and measuring the frequency of vibration detected by said vibration detection means for each cycle based on the vibration signal;

waveform group formation means for forming a waveform group having a plurality of successive waveforms, the variations in each successive two measured frequencies of which are within a predetermined tolerance;

means configured for determining a representative frequency which represents the waveform group; and tension calculation means configured for calculating the tension in said object to be measured by substituting the representative frequency into a predetermined calculation formula and providing tension data indicative of the tension calculated.

21. The apparatus according to claim 20, which further comprises means for selecting a particular waveform group having the greatest number of waveforms from among a plurality of waveform groups which have been formed;

said representative frequency determination means determining a frequency which represents said particular waveform group.

22. The apparatus according to claim 20, which further comprises means for selecting a particular waveform group including vibrations which occurred toward the end of the vibration duration of said object to be measured from among a plurality of waveform groups which have been formed;

said representative frequency determination means determining a frequency which represents said particular waveform group.

23. The apparatus according to claim 20, which further comprises means for selecting a particular waveform group including a representative waveform with the lowest frequency among a plurality of waveform groups which have been formed;

said representative frequency determination means determining the representative frequency of said particular waveform group.

24. The apparatus according to claim 20, wherein said waveform group includes a plurality of waveforms, and at least one of the difference and the variation ratio of a waveform in said group with respect to a reference frequency is within a predetermined tolerance, said reference frequency being a frequency of one cycle waveform selected from among vibration waveforms detected by said vibration detection means.

* * * * *

UNITED STATES PATENT AND TRADEMARK OFFICE
CERTIFICATE OF CORRECTION

PATENT NO. : 5,435,191

DATED : July 25, 1995

INVENTOR(S) : Kawachi

It is certified that error appears in the above-indentified patent and that said Letters Patent is hereby corrected as shown below:

Column 11, line 42, insert --a-- before "vibration", first occurrence

Signed and Sealed this

Twenty-eighth Day of November 1995

Attest:

BRUCE LEHMAN

Attesting Officer     Commissioner of Patents and Trademarks